US005862665A

United States Patent [19]
Maruyama et al.

[11] Patent Number: 5,862,665
[45] Date of Patent: Jan. 26, 1999

[54] APPARATUS FOR PREVENTING REVERSE ROTATION FOR HYDRAULIC ACTUATOR

[75] Inventors: Jun Maruyama; Shuji Hori; Kei Kawabata; Hiroshi Endo, all of Tochigi-ken, Japan

[73] Assignee: Komatsu Ltd., Japan

[21] Appl. No.: 849,097

[22] PCT Filed: Dec. 8, 1995

[86] PCT No.: PCT/JP95/02528

§ 371 Date: May 28, 1997

§ 102(e) Date: May 28, 1997

[87] PCT Pub. No.: WO96/18041

PCT Pub. Date: Jun. 13, 1996

[30] Foreign Application Priority Data

Dec. 8, 1994 [JP] Japan .................................... 6-304947

[51] Int. Cl.[6] ............................ F16D 31/02; F16D 39/00

[52] U.S. Cl. ................................ 60/468; 60/493; 60/494

[58] Field of Search ............................ 60/493, 494, 468, 60/459

[56] References Cited

U.S. PATENT DOCUMENTS

| | | | |
|---|---|---|---|
| 4,586,332 | 5/1986 | Schexnayder | 60/493 X |
| 4,694,647 | 9/1987 | Yoshida | 60/494 X |
| 4,850,192 | 7/1989 | Mitsumasa et al. | 60/494 X |
| 5,419,132 | 5/1995 | Sato et al. | 60/493 X |

FOREIGN PATENT DOCUMENTS

| | | | |
|---|---|---|---|
| 57-25570 | 2/1982 | Japan . | |
| 0134064 | 8/1982 | Japan | 60/493 |
| 60-215103 | 10/1985 | Japan . | |
| 4-119206 | 4/1992 | Japan . | |
| 4-224302 | 8/1992 | Japan . | |
| 4-351305 | 12/1992 | Japan . | |

*Primary Examiner*—Hoang Nguyen
*Attorney, Agent, or Firm*—Rader, Fishman & Grauer; Ronald P. Kananen

[57] ABSTRACT

A reverse rotation preventing apparatus for a hydraulic actuator includes a hydraulic actuator for driving an inertia member, a main valve which is switched to a driving position in which a pressure oil is supplied to one of first and second ports of the hydraulic actuator and another one thereof is communicated with a tank and to a neutral position in which the first and second ports are shut off, a relief valve adapted to flow out a pressure oil in the first or second port to the tank at a time when a pressure on the side of the first or second port is higher than a set high pressure, a suction valve adapted to suck the pressure oil to the first or second port at a time when the pressure on the side of the first or second port is negative, and a reverse rotation preventing valve adapted to communicate the first and second port sides with the tanks respectively at a time when the pressure on the sides of the first and second ports is higher than a set pressure which is a pressure lower than the set high pressure.

9 Claims, 8 Drawing Sheets

APPARATUS FOR PREVENTING REVERSE ROTATION FOR HYDRAULIC ACTUATOR

TECHNICAL FIELD

The present invention relates to an apparatus for preventing reverse rotation of a hydraulic motor driving an inertia member (an object having a large inertia) such as a swing hydraulic motor for swinging an upper revolving member of a power shovel or a cylinder for swinging an arm or boom.

BACKGROUND ART

When a hydraulic motor for driving an inertia member is stopped, first and second main circuits connected to first and second ports of the hydraulic motor are shut off by brake valves. However, in such case, since the hydraulic motor is rotated by an inertia force of the inertia member to thereby cause a pumping function which causes a cavitation to one of the first and second main circuits, the first and second main circuits are communicated through a relief valve so that a pressure oil drained from one of the ports flows, through the pumping function of the hydraulic motor, to the other one of the ports to smoothly stop the hydraulic motor.

However, when the hydraulic motor is stopped by the manner mentioned above, an elastic energy is stored to a connection shaft connecting the hydraulic motor and the inertia member at the hydraulic motor stopping time, the hydraulic motor is reversely driven by the elastic energy, and the hydraulic motor is then stopped through the repetition of such operation. That is, a reverse rotation phenomenon due to reaction or rebound force caused at this time is generated, this phenomenon being called herein a rebound reverse rotation phenomenon.

For the reason described above, for example, as disclosed in Japanese Patent Laid-open Publication No SHO 57-25570, there is provided a reverse rotation preventing apparatus for preventing the rebound reverse rotation phenomenon by disposing reverse rotation preventing valves to the first and second main circuits, respectively, in a manner that when a pressure in one of the main circuits exceeds a preset pressure, a high pressure oil flows to the other one of the main circuits.

According to such reverse rotation preventing apparatus, since the high pressure oil in one of the main circuits is merely drained to the other one thereof, much time is taken up to the time when the pressures in the first and second main circuits are lowered, and hence, much time is also taken up to the time when the rebound reverse rotation phenomenon is settled. That is, the hydraulic motor is much reversely rotated till the operation of the hydraulic motor stops.

As mentioned above, the fact that much time is taken up to the settling of the rebound reverse rotation phenomenon means that much time is also taken up from the starting of the hydraulic motor stopping operation to the actual stopping thereof. Accordingly, when applied to a hydraulic power shovel, a time interval required from the swinging time of the upper revolving member to an excavation starting time is made long, lowering a working efficiency.

Therefore, the present invention aims to provide an apparatus for preventing a reverse rotation of a hydraulic actuator capable of making short a time interval up to the settling of the rebound reverse rotation phenomenon when a hydraulic actuator such as hydraulic motor is operated to stop the same.

DISCLOSURE OF THE INVENTION

To achieve the above object, according to one embodiment of the present invention, there is provided a reverse rotation preventing apparatus for a hydraulic actuator comprising: a hydraulic actuator for driving an inertia member; a main valve which is switched to a driving position in which a pressure oil is supplied to one of first and second ports of the hydraulic actuator and another one thereof is communicated with a tank and to a neutral position in which the first and second ports are shut off; a relief valve adapted to flow out a pressure oil in the first or second port to the tank at a time when a pressure on the side of the first or second port is higher than a set high pressure; a suction valve adapted to suck the pressure oil to the first or second port at a time when the pressure on the side of the first or second port is negative; and a reverse rotation preventing valve adapted to communicate the first and second port sides with the tanks respectively at a time when the pressures on the sides of the first and second ports are higher than a set pressure which is a pressure lower than the set high pressure.

According to the above structure, the high pressure oils on the first and second port sides are directly flowed out to the tanks on an occurrence of a rebound reverse rotation phenomenon of the hydraulic actuator by the elastic energy at a time of stopping the operation of the hydraulic actuator, so that the pressures on the first and second port sides can be lowered in a short time and the rebound reverse rotation phenomenon can be settled in a short time.

In addition to the above structure, it is desired to dispose a delay means such as throttle for delaying flow-out of the pressure oil to a circuit means communicating the first and second port sides respectively to the tanks by the reverse rotation preventing valve.

Furthermore, it may be possible to dispose a change-over valve serving to cause flow-out of the high pressure oil on the first and second port sides in a case of a pressure higher than another set pressure.

Furthermore, it may be possible to dispose a second delay means such as throttle or combination of a throttle and a check valve for delaying change-over time from a communication position to a shut-off position of the reverse rotation preventing valve to a circuit means for controlling communication and shut-off of the reverse rotation preventing valve.

Still furthermore, it is desired that the reverse rotation preventing valve is composed of first and second valves which are communicated and shut off respectively by pressures on the first and second port sides.

BRIEF DESCRIPTION OF THE DRAWINGS

The present invention will become more understandable from the following detailed description and accompanying drawings representing embodiments of the present invention. Further, it is to be noted that the embodiments shown in the accompanying drawings do not intend to specify the invention and merely intend to make easy the understanding of the invention.

In the accompanying drawings.

PREFERABLE MODES FOR EMBODYING THE INVENTION

Hereunder, an apparatus for preventing reverse rotation of a hydraulic actuator according to the present invention will be described with reference to the accompanying drawings.

Figure 1:
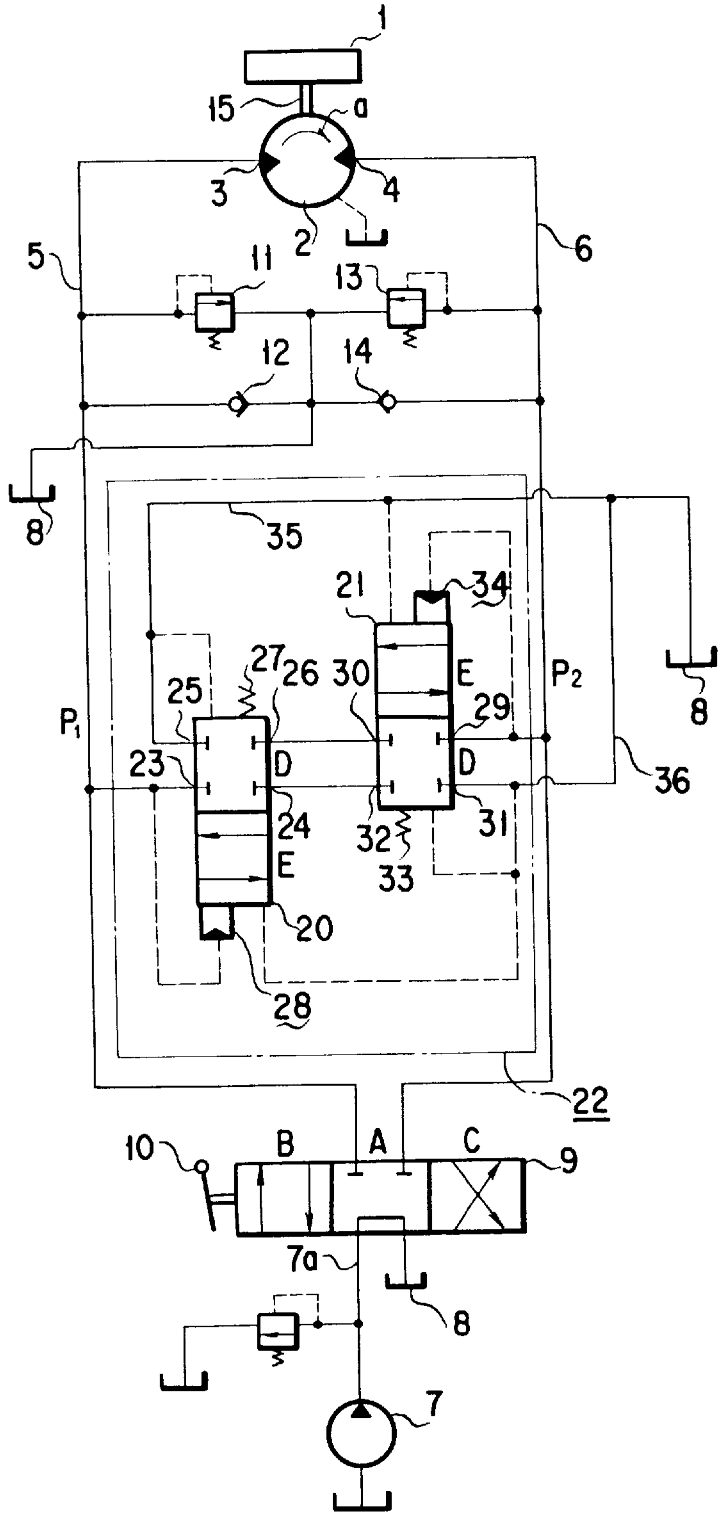
FIG. 1 is a hydraulic circuit diagram including a first embodiment of an apparatus for preventing reverse rotation of a hydraulic actuator according to the present invention.

FIG. 1 represents the first embodiment. This embodiment has a structure such that first and second main circuits 5 and 6 are connected respectively to first and second ports 3 and 4 of a hydraulic actuator, such as hydraulic motor 2, for rotating an inertia member 1 and the communication between the first and second main circuits 5 and 6 and a drain passage 7*a* of a hydraulic pump 7 and a tank 8 is established or shut off by means of a main valve 9.

The main valve 9 takes a neutral position A at which the drain passage 7*a* is communicated with the tank 8 and the first and second main circuits 5 and 6 are shut off, a first position B at which the drain passage 7*a* is communicated with the first main circuit 5 and the second main circuit 6 is communicated with the tank 8, and a second position C at which the drain passage 7*a* is communicated with the second main circuit 6 and the first main circuit 5 is communicated with the tank 8. The main valve 9 is changed over to the respective positions by means of an operation lever 10.

Further, the main valve 9 may take a structure in which the drain passage 7*a* is shut off or communicated with another circuit at the neutral position A of the main valve 9. Furthermore, the main valve 9 may also have a structure, such as disclosed in Japanese Utility Model Laid-open Publication No. SHO 57-112102, in which the first and second main circuits 5 and 6 are communicated with the tank 8, and in this structure, a counterbalance valve may be provided between the first and second main circuits 5 and 6. That is, there may be arranged means for carrying out a change-over operation between a drive condition in which a pressure oil is supplied to one of the first and second ports 3 and 4 of the hydraulic motor 2 and the other one of the ports is communicated with the tank 8 and a neutral condition in which the first and second ports 3 and 4 are shut off.

In the first main circuit 5, a first relief valve 11 and a first suction valve 12 are connected so that the pressure in the first main circuit 5 does not exceed a set pressure of the first relief valve 11 and, at a time when an inner pressure of the first main circuit 5 becomes negative, an oil in the tank 8 is sucked through the first suction valve 12 to thereby prevent the creation of the negative pressure in the first main circuit 5.

In the second main circuit 6, a second relief valve 13 and a second suction valve 14 are connected so that the pressure in the second main circuit 6 does not exceed a set pressure of the second relief valve 13 and, at a time when an inner pressure of the second main circuit 6 becomes negative, an oil in the tank 8 is sucked through the second suction valve 14 to thereby prevent the creation of the negative pressure in the second main circuit 6.

A reverse rotation preventing valve 22 is composed of a first valve 20 and a second valve 21. The first valve 20 is held to a shut-off position D for shutting off first, second, third and fourth ports 23, 24, 25 and 26 by means of a spring 27 to be capable of changing over to a communication position E at which the first and second ports 23 and 24 are communicated and the third and fourth ports 25 and 26 are also communicated by means of a pressure of a pressure oil in a pressure receiving chamber 28.

The second valve 21 is held to a shut-off position D for shutting off first, second, third and fourth ports 29, 30, 31 and 32 by means of a spring 33 to be capable of changing over to a communication position E at which the first and second ports 29 and 30 are communicated and the third and fourth ports 31 and 32 are also communicated by means of a pressure of a pressure oil in a pressure receiving chamber 34. The second valve 21 has substantially the same structure as that of the first valve 20.

The first port 23 of the first valve 20 is connected to the first main circuit 5 and also connected to the pressure receiving chamber 28, the second port 24 thereof is connected to the fourth port 32 of the second valve 21, the third port 25 is connected to a first drain passage 35, and the fourth port 26 is communicated with the second port 30 of the second valve 21.

The first port 29 of the second valve 21 is connected to the second main circuit 6 and also connected to the pressure receiving chamber 34, and the third port 31 thereof is connected to a second drain passage 36.

According to the arrangement described above, the first and second valves 20 and 21 take their shut-off positions D at a time when the pressures $P_1$ and $P_2$ in the first and second main circuits 5 and 6 become lower than a set pressure of, for example, 20 $Kg/cm^2$ and take their communication positions E at a time when the pressures become more than the set pressure.

The operation of the present embodiment will be described hereunder.

First, the main valve 9 is operated to take the first position B by which the drain pressure oil from the hydraulic pump 7 is supplied to the first port 3 of the hydraulic motor 2 through the first main circuit 5 and the second port 4 thereof is communicated with the tank 8 through the second main circuit 6. The hydraulic motor 2 is thereby rotated in a clockwise direction of the arrow a.

At this time, although the first valve 20 takes its communication position E with the pressure $P_1$ of the first main circuit 5, because the pressure $P_2$ of the second main circuit 6 is substantially zero, the second valve 21 takes its shut-off position, and accordingly, the first and second valves 20 and 21 attain no function as reverse rotation preventing valve means.

When the main valve 9 is then shifted to the neutral position A from the state mentioned above, the first and second main circuits 5 and 6 are shut off and the hydraulic motor 2 is rotated in the direction of the arrow a by the inertia energy of the inertia member 1 and attains the pumping function. According to such operation, the pressure $P_2$ of the second main circuit 6 increases. However, in the case of large inertia energy, the pressure $P_2$ becomes more than the set pressure, for example, of 300 $Kg/cm^2$, of the second relief valve 13, and as a result, the pressure oil in the second main circuit 6 flows out into the tank 8 through the relief function of the second relief valve 13, thus the inertia energy to absorbed.

In this moment, the second valve 21 takes its communication position E. However, because the pressure in the first main circuit 5 is substantially zero, the first and second valves 20 and 21 attain no function as reverse rotation preventing valve means.

Thereafter, since the hydraulic motor 2 is subjected to a force to be rotated in a direction reverse to the arrow direction a by the elastic energy stored in the inertia member 1 and the connection shaft 15 of the hydraulic motor 2, the pressure $P_2$ in the second main circuit 6 decreases and the pressure $P_1$ in the first main circuit 5 increases. The hydraulic motor 2 is then stopped through the repetition of such operations. That is, it is said that the hydraulic motor 2 is stopped while causing the rebound reverse rotation phenomenon.

When the rebound reverse rotation phenomenon is caused, the first and second valves 20 and 21 operate as the reverse rotation preventing valve 22 to thereby early settle the rebound reverse rotation phenomenon.

The above operation will be mentioned in detail hereunder.

As mentioned above, when the pressure $P_2$ in the second main circuit 6 increases through the pumping operation of the hydraulic motor 2, the second valve 21 takes the communication position E, and under the state, when the hydraulic motor 2 is reversely rotated by the elastic energy mentioned above, the pressure $P_1$ in the first main circuit 5 increases.

According to this operation, the first valve 20 takes the communication position E and the first main circuit 5 is communicated with the second drain passage 36 through the first and second ports 23 and 24 of the first valve 20 and the fourth and third ports 32 and 31 of the second valve 21, and the high pressure oil in the first main circuit 5 flows out into the tank 8. On the other hand, the second main circuit 6 is communicated with the first drain passage 35 through the first and second ports 29 and 30 of the second valve 21 and the fourth and third ports 26 and 25 of the first valve 20, and the high pressure oil in the second main circuit 6 flows out into the tank 8. Through such operations, the elastic energy mentioned above is absorbed and the rebound reverse rotation phenomenon can be early settle.

That is, since the reverse rotation preventing valve 22 serves so that the high pressure oils caused in the first and second main circuits 5 and 6 flow out into the tanks 8 at the time of generating the rebound reverse rotation phenomenon, the pressures in the first and second main circuits 5 and 6 decrease in an early stage to thereby early settle the rebound reverse rotation phenomenon.

Further, during the operations mentioned above, if the pressure in the first or second main circuit 5 or 6 lowers below the set pressure necessary for changing over the communication position E of the first or second valve 20 or 21, the first or second valve 20 or 21 immediately takes the shut-off position D to thereby stop the operation for flowing out the high pressure oil in the first and second main circuit 5 and 6 into the tanks 8.

Figure 2:
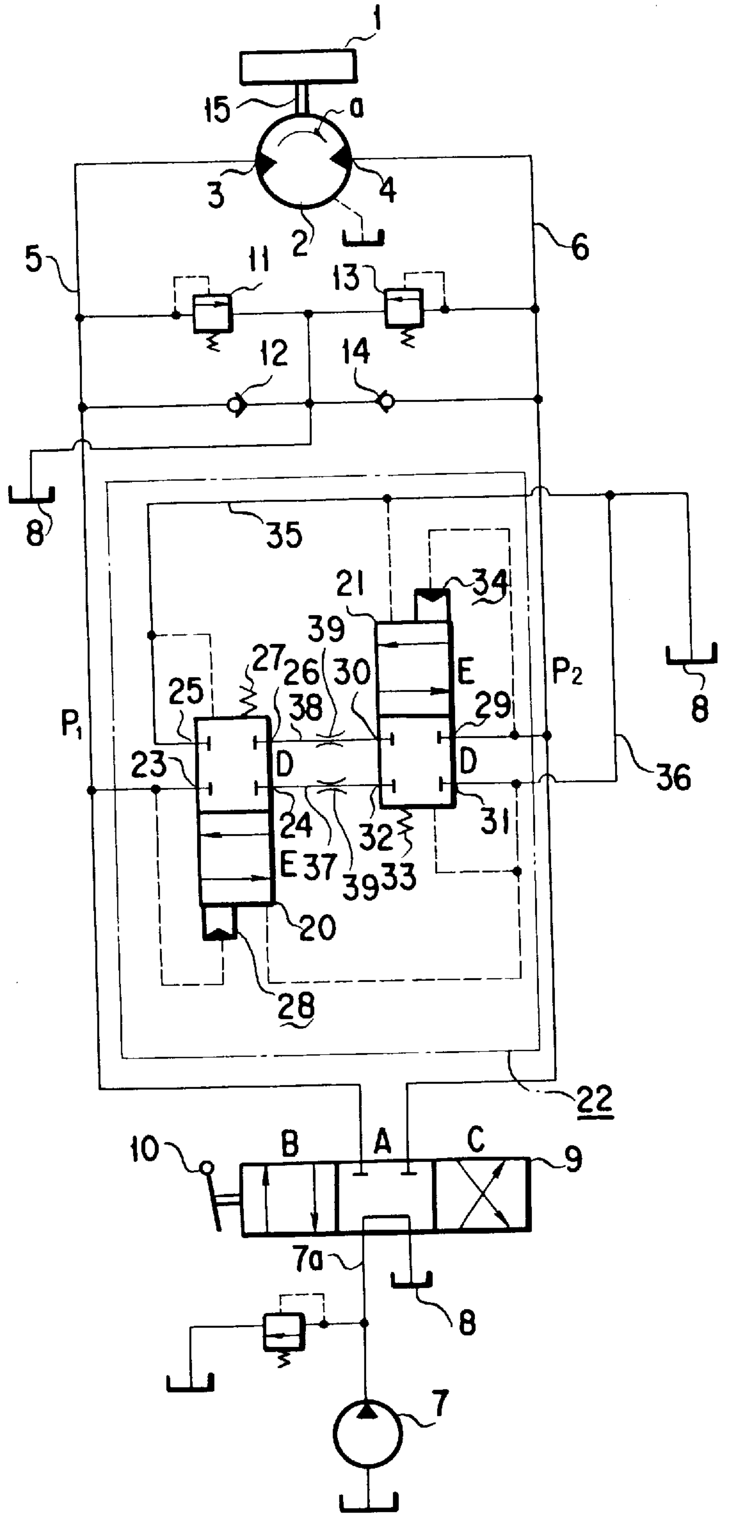
FIG. 2 is a hydraulic circuit diagram including a second embodiment of an apparatus for preventing reverse rotation of a hydraulic actuator according to the present invention.

FIG. 2 represents the second embodiment of the present invention. In this embodiment, throttles 39 are provided respectively for a circuit 37 communicating the second port 24 of the first valve 20 with the fourth port 32 of the second valve 21 and for a circuit 38 communicating the fourth port 26 of the first valve 20 and the second port 30 of the second valve 21.

According to this arrangement, since the high pressure oil in the first and second main circuits 5 and 6 slowly flows out towards the tanks 8, the pressure in the main circuits 5 and 6 changes slowly, that is, the first and second valves 20 and 21 are slowly changed over, so that a hunting phenomenon is hardly caused.

The throttle(s) 39 may be provided for only one of the circuits 37 and 38, for both or only one of the first and second drain passages 35 and 36, or both or only one of the passages between the first and second valves 20 and 21 and the main circuits 5 and 6.

That is, it may be said that the throttle(s) 39 is provided for both or one of a portion through which the first main circuit 5 is communicated with the tank 8 and a portion through which the second main circuit 6 is communicated with the tank 8.

Figure 3:
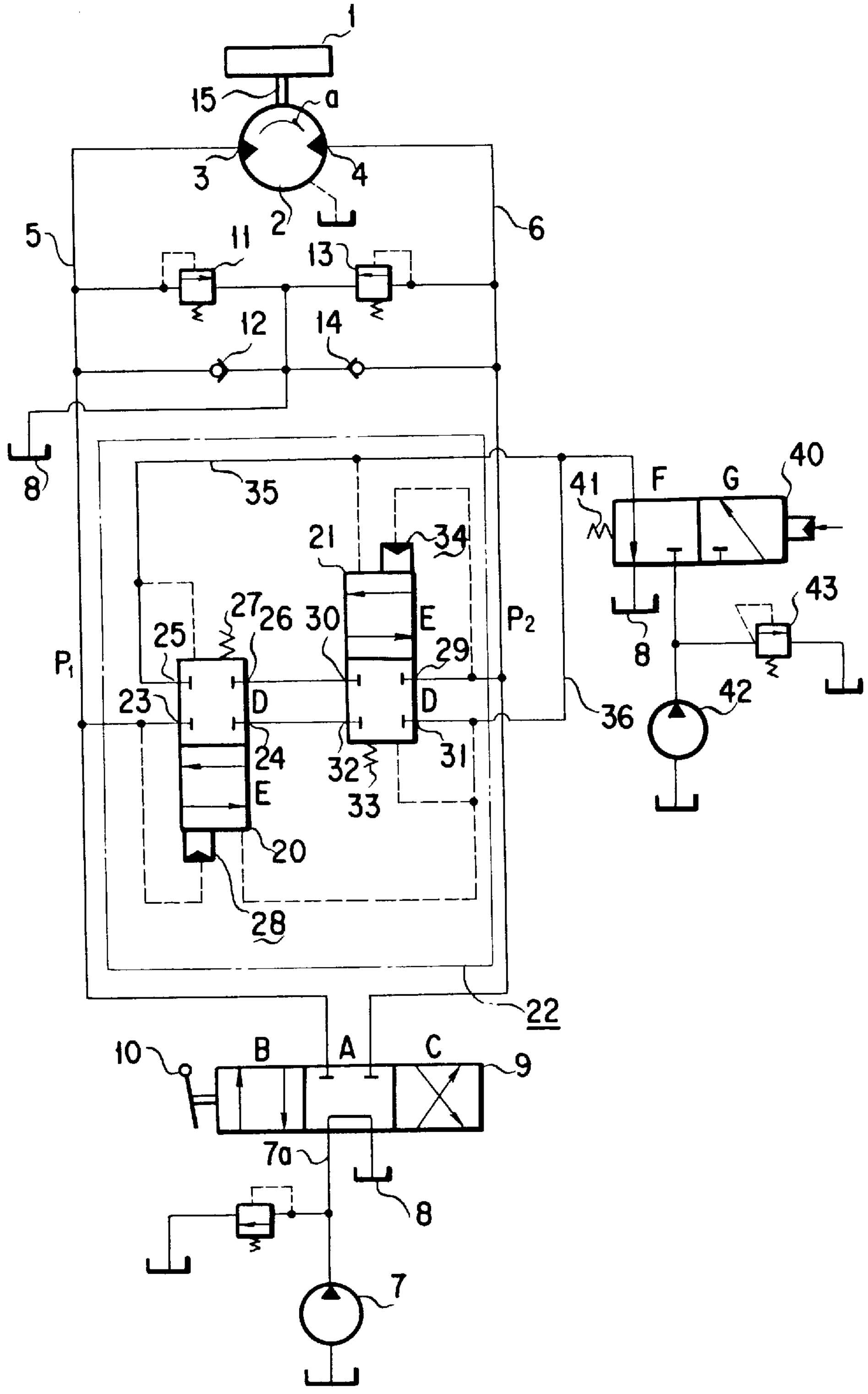
FIG. 3 is a hydraulic circuit diagram including a third embodiment of an apparatus for preventing reverse rotation of a hydraulic actuator according to the present invention.

FIG. 3 represents the third embodiment of the present invention. In this embodiment, a change-over valve 40 is disposed to a portion between the first and second drain passages 35 and 36 and the tank 8, and the change-over valve 40 is held to a drain position F by a spring 41 and takes a pressure oil supply position G by an external force such as pilot pressure oil, electromagnetic force, hand force, etc., thereby supplying the pressure oil from an auxiliary hydraulic pump 42 to the first and second drain passages 35 and 36. A relief valve 43 is connected to a drain passage of the auxiliary hydraulic pump 42.

According to such arrangement, when the change-over valve 40 is shifted to the pressure oil supply position G, the pressure oil having the set pressure of the relief valve 43 is supplied to the first and second drain passages 35 and 36. When the first and second valves 20 and 21 take their communication positions E, the flow of the pressure oil from the first and second main circuits 5 and 6 to the first and second drain passages 35 and 36 becomes worse, so that an operation for quickly settling the rebound reverse rotation phenomenon is not performed.

Figure 4:
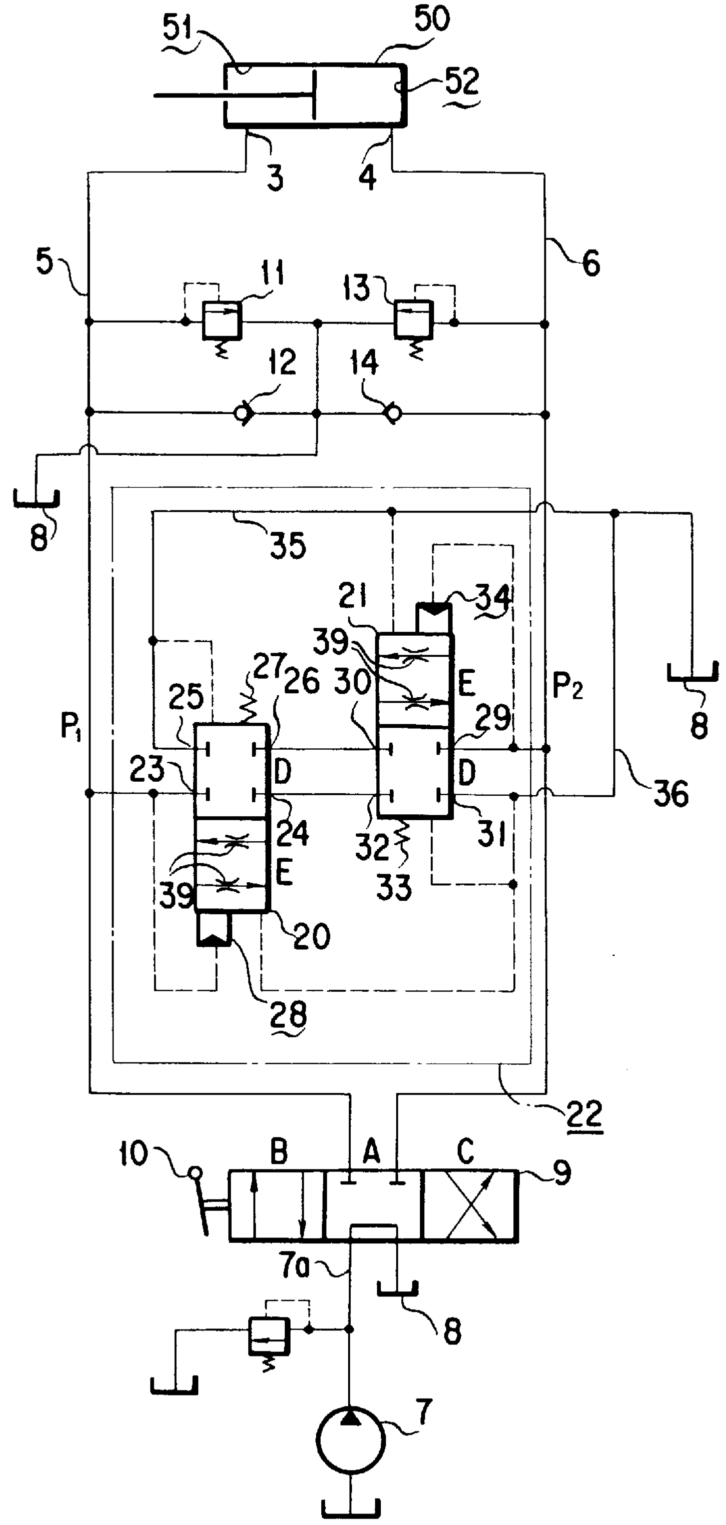
FIG. 4 is a hydraulic circuit diagram including a fourth embodiment of an apparatus for preventing reverse rotation of a hydraulic actuator according to the present invention.

FIG. 4 represents the fourth embodiment of the present invention. In this embodiment, the first and second main circuits 5 and 6 are connected to the first port 3 opened to a first chamber 51 of a cylinder 50 and the second port 4 opened to a second chamber 52 of the cylinder 50, respectively, to make the cylinder expand or contract 50. The throttles 39 are disposed in the first and second valves 20 and 21.

Figure 5:
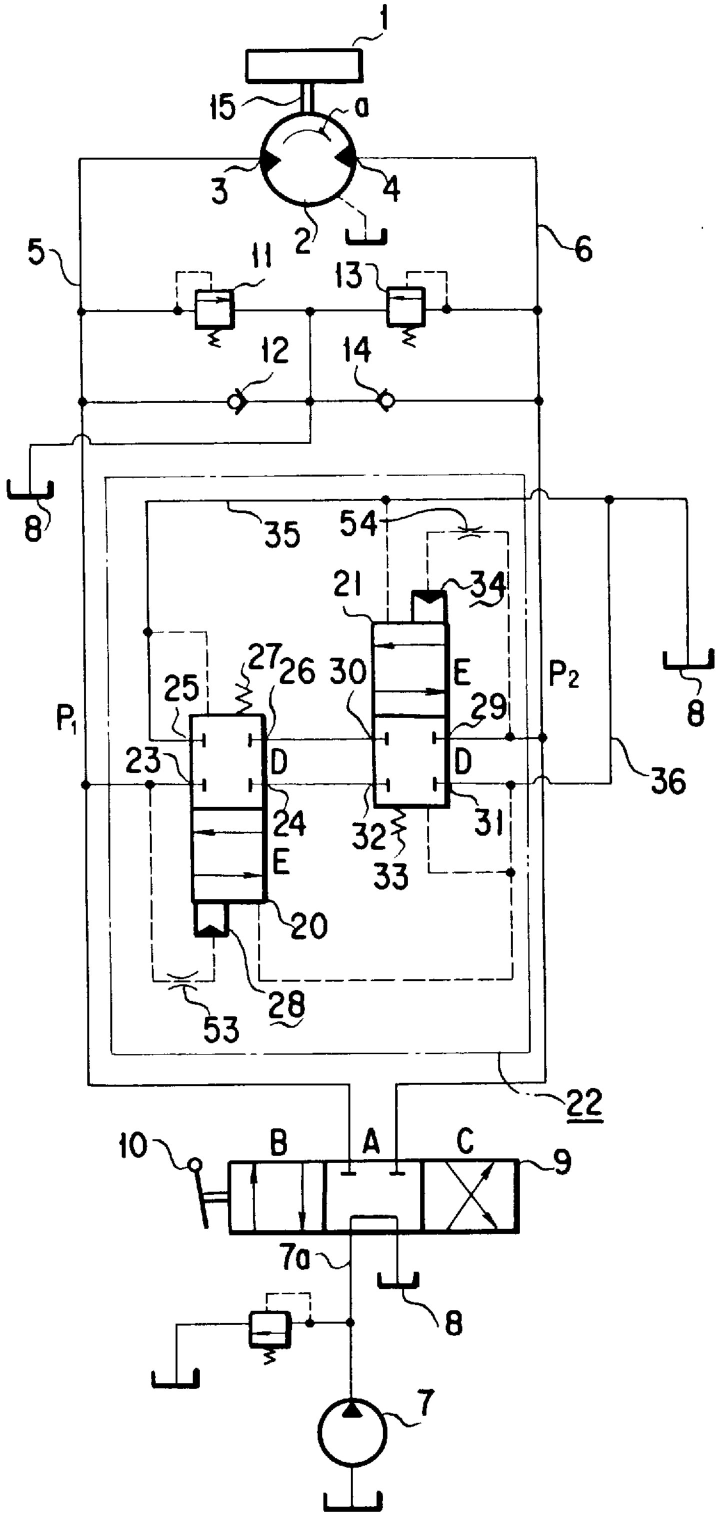
FIG. 5 is a hydraulic circuit diagram including a fifth embodiment of an apparatus for preventing reverse rotation of a hydraulic actuator according to the present invention.
Figure 6:
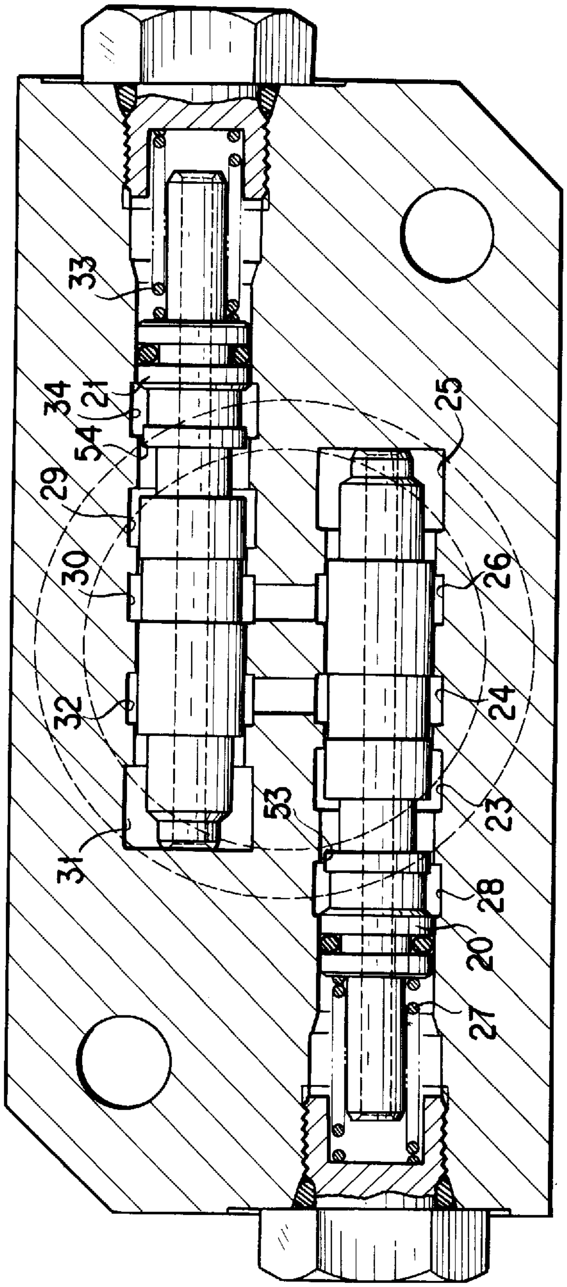
FIG. 6 is a sectional view of an important portion of the fifth embodiment.

FIG. 5 represents the fifth embodiment of the present invention. In this embodiment, in addition to the arrangement of the first embodiment, throttles 53 and 54 are provided respectively for a circuit between the first port 23 of the first valve 20 and the pressure receiving chamber 28 and for a circuit between the first port 29 and the pressure receiving chamber 34. These throttles 53 and 54 are formed by circular spaces defined between outer peripheral surfaces of spools of the first and second valves 20 and 21 and inner peripheral surfaces of spool holes. These throttles 53 and 54 may be formed by orifices formed to the spools or housings of the first and second valves 20 and 21.

According to the arrangement mentioned above, at a time when the first and second valves 20 and 21 return to their shut-off positions D from the communication positions E, these valves return slowly till the time when the pressure oils in the pressure receiving chambers 28 and 34 flow to the ports 23 and 29, respectively, so that the first and second valves 20 and 21 have the communication positions E for a long time interval, and accordingly, the time for flowing out the high pressure oil in the first and second main circuits 5 and 6 is lengthened, thus more quickly lowering the pressures in the first and second main circuits 5 and 6 to thereby more speedily settle the rebound reverse rotation phenomenon.

The arrangement of the throttles 53 and 54 as in the present embodiment has a simple and compact structure involving less cost in comparison with the arrangement of a slow return valve.

Figure 7:
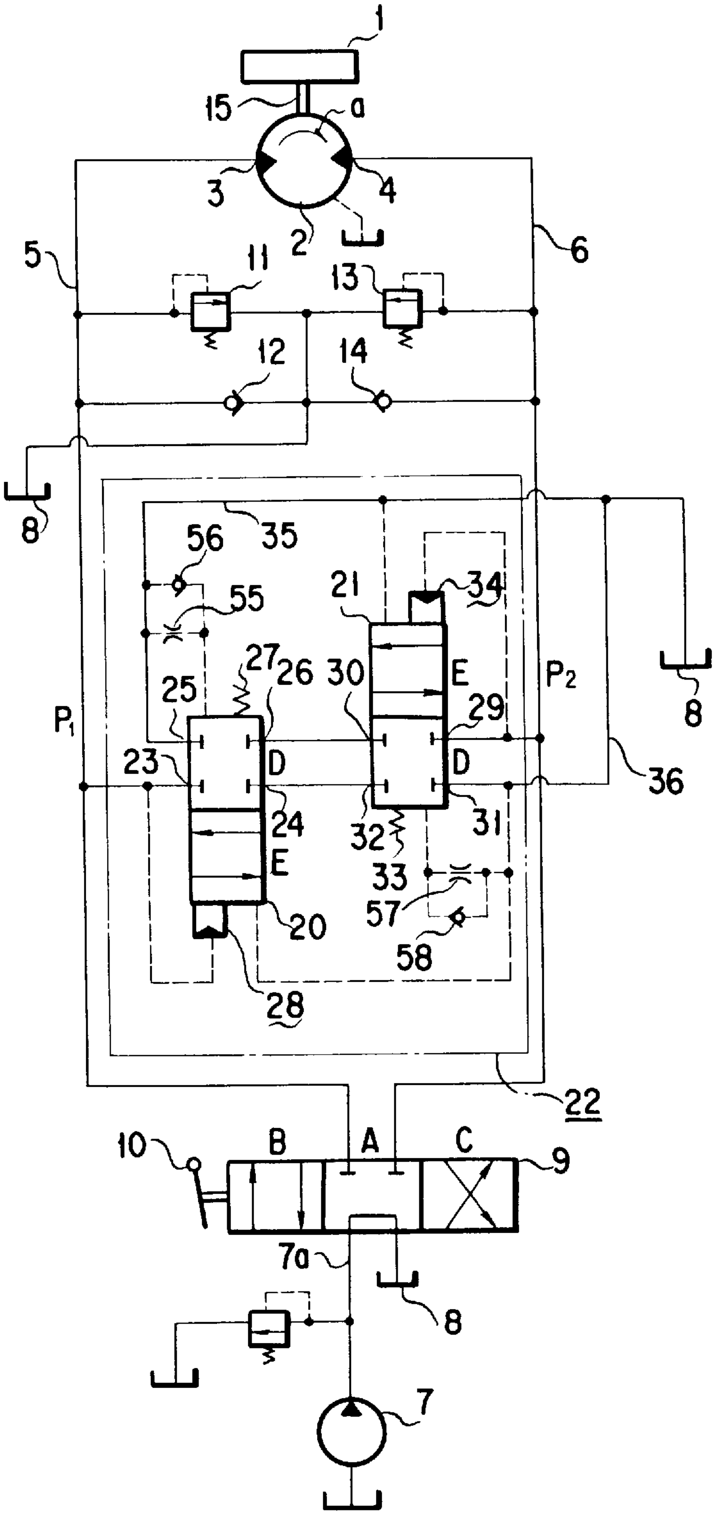
FIG. 7 is a hydraulic circuit diagram including a sixth embodiment of an apparatus for preventing reverse rotation of a hydraulic actuator according to the present invention.

FIG. 7 represents the sixth embodiment of the present invention. In this embodiment, in addition to the structure of the first embodiment, a portion in which the spring 27 of the first valve 20 is accommodated is constructed as an oil chamber, a throttle 55 and a check valve 56 are disposed between the oil chamber and the first drain passage 35, and a throttle 57 and a check valve 58 are disposed between the oil chamber and the second drain passage 36. According to such arrangement, at the time when the first and second valves 20 and 21 return to their shut-off positions D from their communication positions E, the oil flow towards the respective oil chambers becomes delayed, so that the switching function from the communication positions E to the shut-off positions D is also delayed, and as a result, the first and second valves 20 and 21 stay much time in their switched communication positions E.

Figure 8:
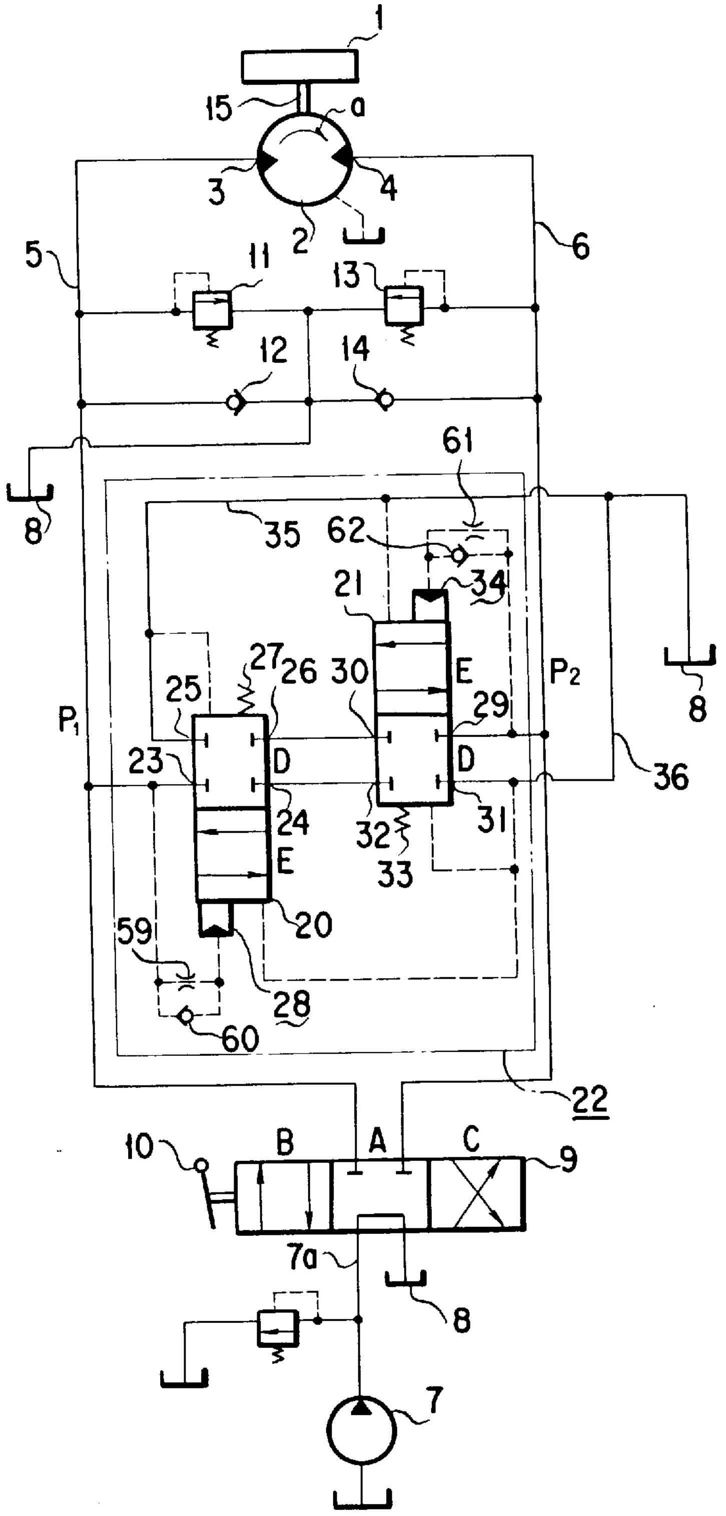
FIG. 8 is a hydraulic circuit diagram including a seventh embodiment of an apparatus for preventing reverse rotation of a hydraulic actuator according to the present invention.

FIG. 8 represents the seventh embodiment of the present invention. In this embodiment, in addition to the structure of the first embodiment, a throttle 59 and a check valve 60 are disposed between the pressure receiving chamber 28 and the first port 23 and a throttle 61 and a check valve 62 are disposed between the pressure receiving chamber 34 and the first port 29. According to this arrangement, at the time when the first and second valves 20 and 21 return to their shut-off positions D from their communication positions E, the oil flow from the pressure receiving chambers 28 and 34 to the respective oil chambers becomes delayed, so that the switching from the communication positions E to the shut-off positions D is also delayed, and as a result, the first and second valves 20 and 21 stay much of the time in their switched communication positions E.

Further, it is to be noted that any combination of either one of the second, fourth, fifth, sixth and seventh embodiments with the third embodiment is possible. Furthermore, it is possible to combine the second or fourth embodiment with either one of the fifth, sixth and seventh embodiments.

As mentioned hereinbefore, according to the reverse rotation preventing apparatus of the hydraulic actuator of the present invention, when the rebound reverse rotation phenomenon is caused to the hydraulic actuator by the elastic energy at a time of the stopping of the operation of the hydraulic actuator, the high pressure oils on the first and second port sides directly flow into the tanks, so that the pressures on the first and second port sides are lowered in a short time period and the rebound reverse rotation phenomenon can be settled in a short time period.

Further, it is self-evident to a person skilled in the art that although the present invention is described hereinbefore with reference to the exemplary embodiments, it is possible to make various changes, deletions and additions to the disclosed embodiment without departing from the subject and scope of the present invention. Accordingly, it is to be understood that the present invention is not limited to the described embodiments and includes scopes or its equivalent scope defined by the elements recited in the appended claims.

What is claimed is:

1. A reverse rotation preventing apparatus for a hydraulic actuator comprising:

a hydraulic actuator for driving an inertia member;

a main valve which is switched to a driving position in which a pressure oil is supplied to one of first and second ports of the hydraulic actuator and another one thereof is communicated with a tank and to a neutral position in which said first and second ports are shut off;

a relief valve adapted to flow out a pressure oil in said first or second port to the tank at a time when a pressure on the side of said first or second port is higher than a set high pressure;

a suction valve adapted to suck the pressure oil to said first or second port at a time when the pressure on the side of said first or second port is negative; and a reverse rotation preventing valve adapted to communicate said first and second port sides with the tanks respectively at a time when the pressure on the sides of said first and second ports is higher than a set pressure which is a pressure lower than said set high pressure.

2. A reverse rotation preventing apparatus for a hydraulic actuator according to claim 1, wherein a first delay means for delaying flow-out of the pressure oil is provided for a circuit means communicating said first and second port sides respectively with the tanks by said reverse rotation preventing valve.

3. A reverse rotation preventing apparatus for a hydraulic actuator according to claim 2, wherein said first delay means is a throttle.

4. A reverse rotation preventing apparatus for a hydraulic actuator according to claim 1, wherein a change-over valve is provided for serving to cause flow-out of the high pressure oil on said first and second port sides in a case of a pressure higher than another set pressure.

5. A reverse rotation preventing apparatus for a hydraulic actuator according to claim 2, wherein a change-over valve is provided for serving to cause flow-out of the high pressure oil on said first and second port sides in a case of a pressure higher than another set pressure.

6. A reverse rotation preventing apparatus for a hydraulic actuator according to any one of claims 1 to 5, wherein a second delay means for delaying change-over from a communication position to a shut-off position of said reverse rotation preventing valve is provided for a circuit means for controlling communication and shut-off of the reverse rotation preventing valve.

7. A reverse rotation preventing apparatus for a hydraulic actuator according to claim 6, wherein said second delay means is a throttle.

8. A reverse rotation preventing apparatus for a hydraulic actuator according to claim 6, wherein said second delay means is a combination of a throttle and a check valve.

9. A reverse rotation preventing apparatus for a hydraulic actuator according to any one of claims 1 to 5, wherein said reverse rotation preventing valve is composed of first and second valves which are communicated and shut off respectively by pressures on the first and second port sides.

* * * * *